(12) United States Patent (10) Patent No.: US 7,962,096 B2
Cox (45) Date of Patent: Jun. 14, 2011

(54) SYSTEM AND METHOD FOR A RFID TRANSPONDER FILE SYSTEM

(75) Inventor: Steve Cox, Cleburne, TX (US)

(73) Assignee: Psion Teklogix Inc., Mississauga (CA)

( * ) Notice: Subject to any disclaimer, the term of this patent is extended or adjusted under 35 U.S.C. 154(b) by 348 days.

(21) Appl. No.: 11/245,217

(22) Filed: Oct. 7, 2005

(65) Prior Publication Data

US 2007/0082613 A1 Apr. 12, 2007

(51) Int. Cl.
*H04B 7/00* (2006.01)

(52) U.S. Cl. ... 455/41.2; 455/41.1; 455/558; 340/572.8; 340/825.49; 340/539.32; 340/539.21

(58) Field of Classification Search .......... 455/41.1, 455/41.2, 558; 340/572.8, 825.49, 539.32, 340/539.21
See application file for complete search history.

(56) References Cited

U.S. PATENT DOCUMENTS

| 2004/0119605 A1* | 6/2004 | Schaper | 340/825.49 |
| 2005/0212676 A1* | 9/2005 | Steinberg | 340/572.8 |
| 2006/0253343 A1* | 11/2006 | Gregersen et al. | 705/27 |
| 2007/0067325 A1* | 3/2007 | Weitzner et al. | 707/101 |

* cited by examiner

*Primary Examiner* — Tuan A Pham
(74) *Attorney, Agent, or Firm* — Grant Tisdall; Gowling Lafleur Henderson LLP

(57) ABSTRACT

A system and method for representing on a user interface a plurality of transponders in a file system of a computing device, the user interface provided by the device, the device configured for communicating with the transponders when present in an electromagnetic spectrum in communication range of the device. The communication between the transponders and the device uses radio frequency signals to obtain information of the transponders. The system and method comprises a first memory location configured for storing the transponder information as a plurality of corresponding transponder files in the file system. The system and method also have a driver for coordinating the transfer of the transponder information between the transponder and the first memory location according to an access command, the access command configured for directing the computing device to obtain the transponder information for the transponders when in communication range of the device. The system and method also have a file processor for manipulating the transponder information present in the transponder files, wherein the transponder information contents of the transponder files represents at least a portion of the transponder information available in the electromagnetic spectrum in communication range of the device.

27 Claims, 11 Drawing Sheets

```
// =========================== CODE EXAMPLE (begin) =======================
// Example below is in C++
WIN32_FIND_DATA findData = {0};
// perform a blocking inventory (i.e. does not return until a tag is acquired)
HANDLE findHandle = FindFirstFile(L"\\RFID\\{.}", &findData);
if (findHandle == INVALID_HANDLE_VALUE )
{
                        return false;                              ~ 802
}
FindClose(findHandle);
// the structure only has the name of the file, not the full path...
// you'll need the full path in order for the RFID file system to be
// used
wchar_t pathname[MAX_PATH];
wcscpy(pathname, L"\\RFID\\");
wcscat(pathname, findData.cFileName);

HANDLE fileHandle = CreateFile( pathname,
                        GENERIC_READ,      ~ 802
                        0, OPEN_EXISTING,
                        FILE_ATTRIBUTE_NORMAL,
                                  0 );
if (fileHandle != INVALID_HANDLE_VALUE)
{
return false;
}
// Get the maximum amount of data I can read from the tag
DWORD fileSize = GetFileSize(fileHandle, 0);
BYTE *buffer = new BYTE[fileSize];
DWORD bytesRead = 0;                                ~ 802
BOOL readSuccess = ReadFile(fileHandle,
                        buffer,
                        fileSize,         ~ 802
                        &bytesRead,
                        0);
if ((!readSuccess) || (bytesRead != fileSize))
{
        CloseHandle(fileHandle);
        delete[] buffer;
                        return false;
}
CloseHandle(fileHandle);
delete[] buffer;
return true;
// =========================== CODE EXAMPLE (end) =========================
```

Figure 8

SYSTEM AND METHOD FOR A RFID TRANSPONDER FILE SYSTEM

BACKGROUND OF THE INVENTION

Radio Frequency Identification (RFID) technology is currently growing with new business applications being added continually. The significant advantage of RFID systems is that there is no physical contact requirement between a tracked RFID transponder or tag and a reader, and the systems will operate without line of sight constraints. The tags can be read through a variety of substances and surfaces such as cardboard, plastic, paint, snow, ice, fog and surface contaminants. These and other challenging circumstances can render current barcode technology impractical. RFID tags can also be read at higher speeds and barcode technology and the read/write capabilities of the tags can extend their functionality and value extensively. RFID systems are applicable to a wide variety of automated data collection and identification applications that may not otherwise be possible using current barcode technology.

RFID technology is rapidly becoming a popular substitute to barcode technology for inventory control. Application of RFID technology is still in its infancy, and many customers (potential and current) are still uncomfortable as to how best to utilize RFID technology with present information systems. Examples of potential RFID application include systems with multiple, disparate stakeholders such as the supply chain—separate manufacturing, transportation, warehousing and retail entities utilizing a common system. Purchasing powerhouses like Wal-Mart and the US Department of Defense are driving industries to adopt RFID for supply chain applications. Examples of systems under the control of a single owner, or authority as a standalone solution, include systems used in assembly operations, manufacturing processes, animal tracking, healthcare, railways and the retail industry. One need in RFID systems is a standard user interface for representation of tag information, usable across multiple computer platforms, which can be complex in implementation due to the several currently used RFID standards (e.g. EPC, ISO 18000, etc.).

It is an object of the present invention to provide a file system to obviate or mitigate some of the above-presented disadvantages.

SUMMARY OF THE INVENTION

Application of RFID technology is still in its infancy, and many customers (potential and current) are still uncomfortable as to how best to utilize RFID technology with present information systems. One need in RFID systems is a standard user interface for representation of tag information, usable across multiple computer platforms, which can be complex in implementation due to the several currently used RFID standards (e.g. EPC, ISO 18000, etc.). Contrary to current RFID technology is a system and method for representing on a user interface a plurality of transponders in a file system of a computing device, the user interface provided by the device, the device configured for communicating with the transponders when present in an electromagnetic spectrum in communication range of the device. The communication between the transponders and the device uses radio frequency signals to obtain information of the transponders. The system and method comprises a first memory location configured for storing the transponder information as a plurality of corresponding transponder files in the file system. The system and method also have a driver for coordinating the transfer of the transponder information between the transponder and the first memory location according to an access command, the access command configured for directing the computing device to obtain the transponder information for the transponders when in communication range of the device. The system and method also have a file processor for manipulating the transponder information present in the transponder files, wherein the transponder information contents of the transponder files represents at least a portion of the transponder information available in the electromagnetic spectrum in communication range of the device.

According to a first aspect there is provided a system for representing on a user interface a plurality of transponders in a file system of a computing device, the user interface provided by the device, the device configured for communicating with the transponders when present in an electromagnetic spectrum in communication range of the device, the communication between the transponders and the device using radio frequency signals to obtain information of the transponders, the system comprising: a first memory location configured for storing the transponder information as a plurality of corresponding transponder files in the file system; a driver for coordinating the transfer of the transponder information between the transponder and the first memory location according to an access command, the access command configured for directing the computing device to obtain the transponder information for the transponders when in communication range of the device; and a file processor for manipulating the transponder information present in the transponder files; wherein the transponder information contents of the transponder files represents at least a portion of the transponder information available in the electromagnetic spectrum in communication range of the device.

According to a second aspect there is provided a method for representing on a user interface a plurality of transponders in a file system of a computing device, the user interface provided by the device, the device configured for communicating with the transponders when present in an electromagnetic spectrum in communication range of the device, the communication between the transponders and the device using radio frequency signals to obtain information of the transponders, the method comprising the steps of: transferring the transponder information between the transponder and a first memory location according to an access command, the access command configured for directing the computing device to obtain the transponder information for the transponders when in communication range of the device; storing the transponder information in the first memory location as a plurality of corresponding transponder files in the file system; and manipulating the transponder information present in the transponder files; wherein the transponder information contents of the transponder files represents at least a portion of the transponder information available in the electromagnetic spectrum in communication range of the device.

BRIEF DESCRIPTION OF THE DRAWINGS

These and other features of the present invention will become more apparent in the following detailed description in which reference is made to the appended drawings by way of example only, wherein:

FIG. 8 is an example application for accessing the transponder information using the driver of FIG. 3;

DETAILED DESCRIPTION OF THE PREFERRED EMBODIMENTS

RFID System 10

Figure 1:
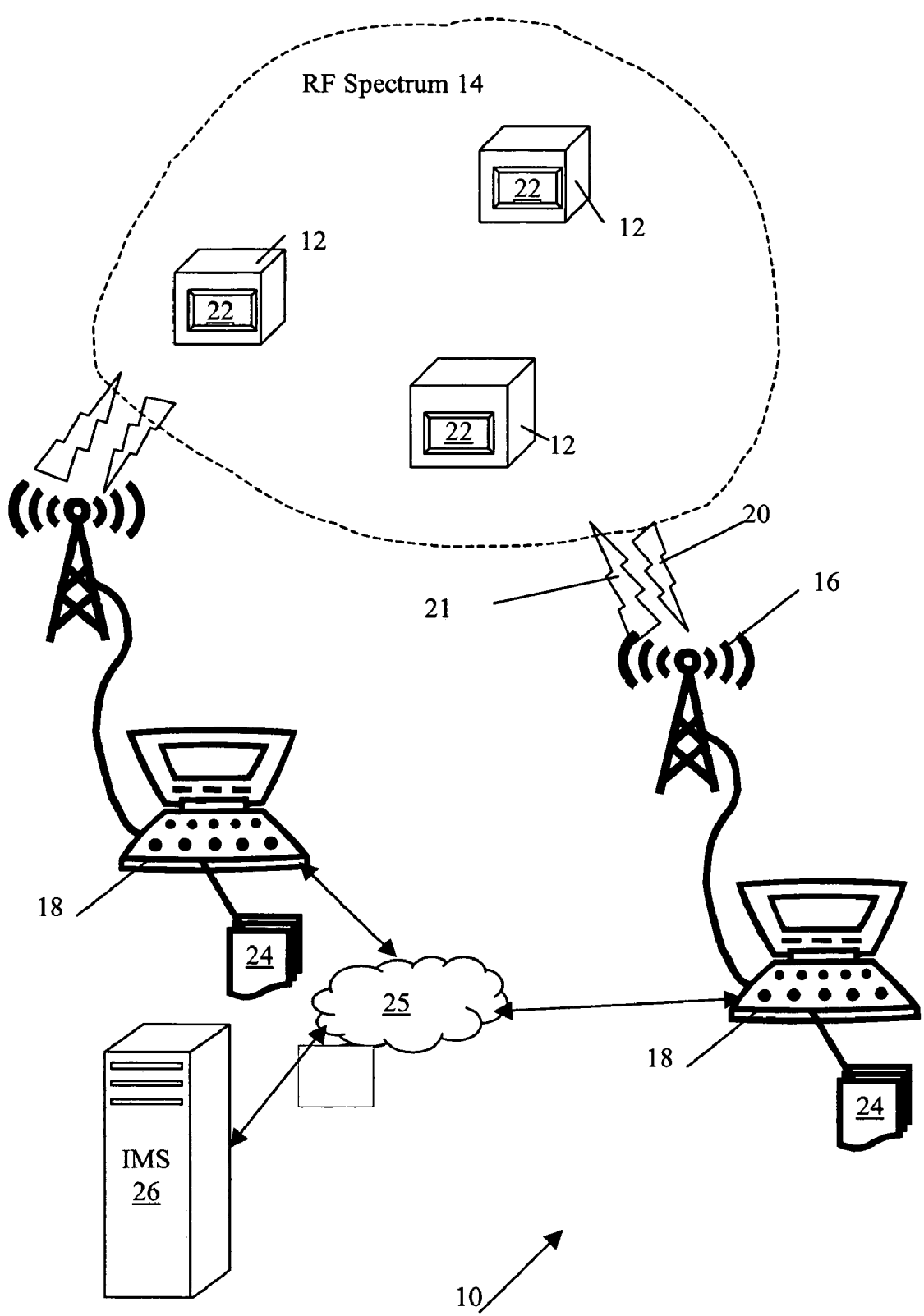
FIG. 1 is a block diagram of a radio frequency identification system (RFID)

Referring to FIG. 1, a RFID (radio frequency identification) system 10, sometimes called dedicated short range communication (DSRC), incorporates the use of electromagnetic or electrostatic coupling in the radio frequency (RF) portion of the electromagnetic spectrum 14 to uniquely identify an object 12 (e.g. animal, container, vehicle or person). One advantage of the RFID system 10 is that it does not use direct contact or line-of-sight scanning, as compared to current barcode scanning technology. The RFID system 10 includes three main components, namely an antenna or coil 16 coupled to a terminal 18 (also known as a reader with a transceiver) which communicates via RF signals 20 with a transponder 22 (e.g. a tag). The terminal 18 can be a stationary computing device or can be a portable computing device (e.g. handheld computer with or without on-board memory). The antenna 16 uses radio frequency waves to transmit the signal 20 that activates the transponder 22. When activated, the transponder 22 transmits data resident in memory of the transponder 22 back to the antenna 16. The data is can be processed by the terminal 18 to notify a programmable logic controller (not shown) that an action should occur, such as but not limited to raising an access gate or interfacing with a local/central database 210 (see FIG. 2) to carry out a database transaction. The terminal 18 has a RFID File System 24 that can be represented as a collection of hardware/software modules that present the manipulation of RFID transponders 22 (in general, reading and writing) and their respective data contents present in the spectrum 14, in terms of accessing a generic storage device. Accessing of the transponders 22 via the file system 24 is implemented on the terminal 18 as accessing files stored on the generic storage device. In addition, accessing/reading/writing the transponders 22 in connection with the file system 24 can be done via XML, or other structured definition languages as further described below.

Antennas 16

Examples of the spectrum 14 accessed by the terminal 18 through the antenna 16 can include: frequencies 30 KHz to 500 KHz having short transmission ranges (generally less than six feet); and frequencies 850 MHz to 950 MHz and 2.4 GHz to 2.5 GHz offering longer transmission ranges (e.g. more than 90 feet). There are many different versions of RFID that operate at different radio frequencies. The choice of frequency can be dependent on the requirements of the application. In particular, three primary frequency bands have been allocated for RFID use. Low Frequency (125/134 KHz) is most commonly used for access control and asset tracking. Mid-Frequency (13.56 MHz) is most commonly used where medium data rate and read ranges are needed. Ultra High-Frequency (850 MHz to 950 MHz and 2.4 GHz to 2.5 GHz) offers the longest read ranges and highest reading speeds.

The radio signal 20 emitted by the antenna 16 activates the transponders 22 present in the spectrum 14, providing for the transponders 22 to be read (via the received signal 21) and in some instances have data written to transponders 22 via the signal 20. Antennas 16 are also available in a wide variety of shapes and sizes to suite specific applications. The antennas 16 can be built into a doorframe to receive transponder 22 data from persons or objects passing through the doorway. The antennas 16 can be mounted under a road surface to monitor vehicle access through a given point or the antennas 16 can be packaged together with a transceiver 200 (see FIG. 2) to become part of the terminal 18.

Transponders/tags 22

The transponders 22 are wireless communication, monitoring, and/or control devices that pick up and automatically respond to the incoming RF signal 20. The term transponder 22 can be defined as a combination of the functionality implied in the words transmitter and responder. As described above, the RFID system 10 uses data stored in suitable transponders 22 as transponder information (e.g. transponder identity, product data of object attached to transponder 22, etc . . . ), which is retrieved at the appropriate time and place by means of the antenna 16 and associated transceiver 200, in order to satisfy a particular application need. As one can easily see in the table below, the RFID tag 22 resembles a traditional electronic digital storage device (MMC) in features and functionality.

| Feature | RFID Tag | MMC | Barcode |
| --- | --- | --- | --- |
| Memory | Variable | Variable | Fixed |
| Writable Memory | Yes | Yes | No |
| Random Memory Access | Yes | Yes | No |
| Memory arranged in blocks | Most | Yes | No |
| Memory can be locked (Read Only) | Most | Some (SDMMC) | NA |

The RF transponders 22 are available in a wide variety of shapes and sizes for carrying data, which may provide identification for an item such as but not limited to in manufacture, goods in transit, the identity of an animal, person or vehicle as well as any item that requires tracking or identification. The shape of the transponders 22 may be as varied as a tube inserted into the stomach of a cow, such as the Impro Bolus tag, to a screw inserted into a wooden crate, a credit card for access control applications and an adhesive label for attachment to inventory items such as computers, printers and paper items. Transponders 22 consist of an integrated circuit (IC) attached to an antenna—typically a small coil of wires—plus some protective packaging as determined by the application requirements. Data is stored in the IC and transmitted through the antenna to the terminal 18 as the signal 21 in response to the signal 20. Transponders 22 can be read-only (stored data can be read but not changed), read/write (stored data can be altered or re-written), or a combination thereof, in which some data of the transponders 22 is permanently stored while other memory of the transponders 22 is left accessible for later encoding and updates, as desired. Transponders 22 are either "passive" (no battery) or "active" (self-powered by a battery), or a combination thereof.

Passive transponders 22 gain their power from that generated by the terminal 18 and can have no internal power source. This type of transponder 22 is typically less expensive and can be smaller and lighter than the active type transponder 22. The passive transponders 22 can offer a virtually unlimited operational lifetime, however their read range is shorter and they need to be activated by a higher-powered antenna 16. Passive transponders 22 can be read only or can have read/write capability. The passive transponder 22 allows a computer or robot to identify an object. Magnetic labels, such as those on credit cards and store items, are common examples of passive transponders 22. Further, the passive transponder 22 is designed for use with an active sensor of the antenna 16 and/or terminal 18 that decodes and transcribes the data the transponder 22 contains.

Active transponders 22 are powered by means of a battery, either internal or from another source such as the battery of an attached vehicle. This battery-supplied power generally gives the active transponders 22 greater read range over the passive type although the active transponders 22 are usually larger in size and more expensive. A typical scenario for the use of active transponders 22 is the control of vehicles through a specified access point. As the tagged vehicle approaches the access point, the active transponder 22 is decoded by the receiver of the terminal 18 and the authorized vehicle is allowed access by means of a gate or boom. Simple active transponders 22 can be employed in location, identification, and navigation systems for commercial and private vehicles. A further example is the active transponders 22 that transmit a coded signal when it receives a request from a monitoring or control point. The transponder 22 output signal 21 is tracked, so the position of the transponder 22 can be constantly monitored. The input 20 (receiver) and output 21 (transmitter) signal frequencies are pre-assigned to the transponder 22, and for example can operate over distances of thousands of miles. Sophisticated active transponders 22 can be used in communications satellites and on board space vehicles. The active transponders 22 can receive incoming signals 20 over a range, or band, of frequencies, and retransmit the signals 21 on a different band at the same time. The active transponders 22 are similar to a repeater of the sort used in land-based cellular telephone networks. The incoming signal 20, usually originating from a point on the earth's surface, is called the uplink. The outgoing signal 21, usually sent to a point or region on the earth's surface, is the downlink. These transponders 22 can operate on an interplanetary scale.

Terminal 18

Figure 2:
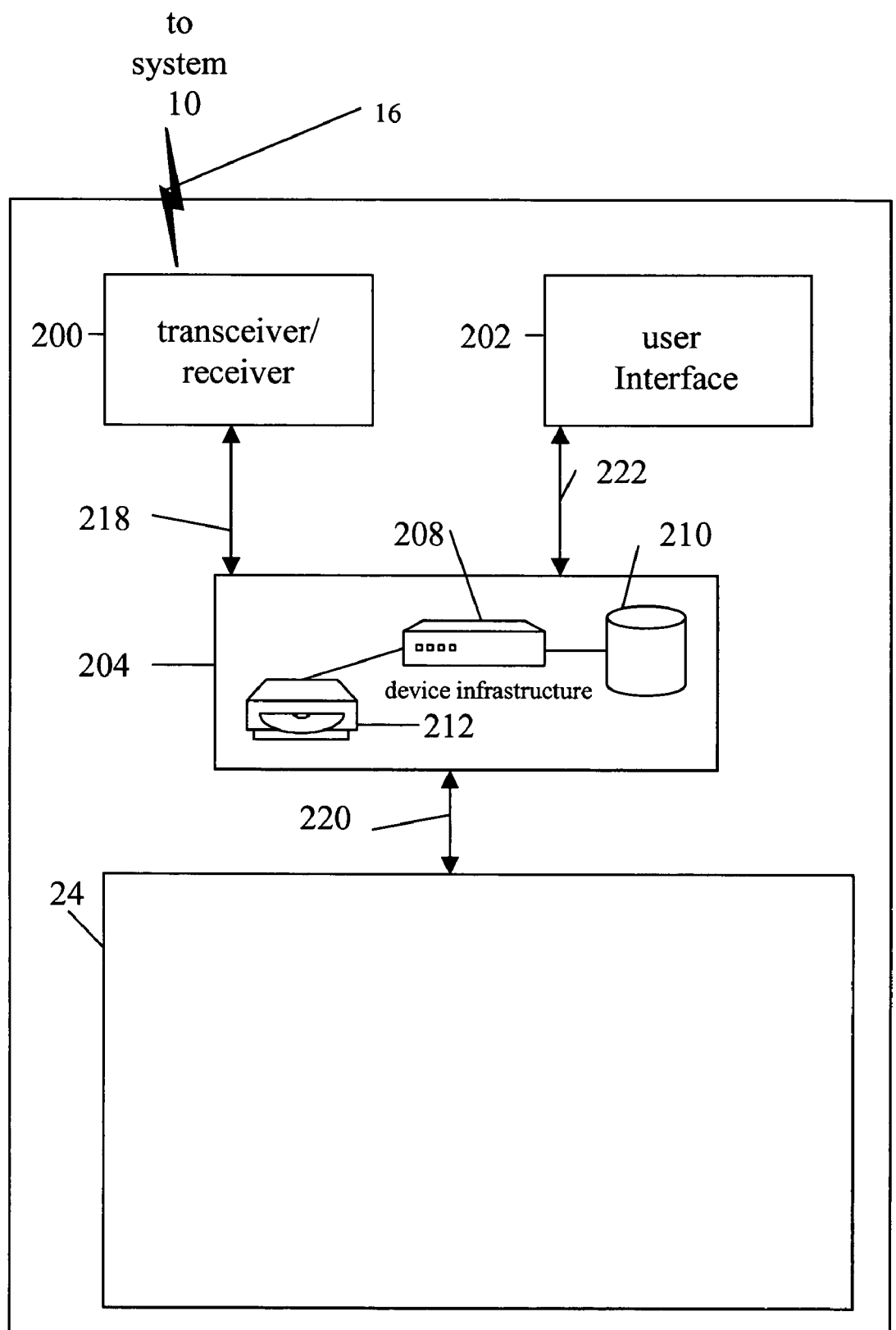
FIG. 2 is a block diagram of a terminal of FIG. 1.

Referring to FIG. 2, the terminal 18 can be either a handheld computer or a fixed computer for access control purposes. The antenna 16 coupled to the terminal 18 emits radio waves, ranging for example anywhere from 1 inch to 4 feet, for example, depending on the power output and the radio frequency used. The transponders 22 passing through the electromagnetic field of the emitted radio waves detect the embedded activation RF signal 20 and respond with the data contents of the transponders 22 via transmitted RF data signals 21. The terminal decodes the transponders' 22 encoded data of the signal 21 and passes the signal data on to a host computer processor 208 and/or an information management system 26 for further processing/storage, which is coupled to the terminal by a network 25 (e.g. wired or wireless). The terminal 18 is basically a radio frequency (RF) transmitter and receiver 200, controlled by the microprocessor or digital signal processor 208. As with transponders 22, terminals 18 can come in a wide range of sizes and offer different features. Terminals 18 can be affixed in a stationary position for example beside a conveyor belt in a factory or dock doors in a warehouse, portable by integrated into a mobile computer that also might be used for scanning bar codes, or even embedded in electronic equipment such as print-on-demand label printers.

Referring to again to FIG. 2, the terminals 18 include the RF connection interface 200, such as a transceiver/receiver with an optional wired/wireless network interface card or a modem, coupled via connection 218 to a device infrastructure 204. The connection interface 200 is connectable during operation of the terminal 18 to the network 25, such as to a wireless network 25 by wireless links (e.g., RF, IR, etc.), which enables the terminals 18 to communicate with each other and with the external systems (such as the information management system 26) via the network 25 for intercommunication of the scanned data of the transponders 22 as well as operational features of the terminals 18 (e.g. operating system upgrades, file system 24 upgrades, etc . . . ).

Referring again to FIG. 2, the terminals 18 also have a user interface 202, coupled to the device infrastructure 204 by connection 222, to interact with a user (not shown). The user interface 202 includes one or more user input devices such as but not limited to a QWERTY keyboard, a keypad, a track wheel, a stylus, a mouse, a microphone and the user output device such as an LCD screen display and/or a speaker. If the screen is touch sensitive, then the display can also be used as the user input device as controlled by the device infrastructure 204. The user interface 202 is employed by the user of the terminals 18 to coordinate the communication of transponder 22 data over the network 25 (see FIG. 1) as well as access to the transponders 22 included in the RFID spectrum 14.

Referring again to FIG. 2, operation of the terminals 18 is enabled by the device infrastructure 204. The device infrastructure 204 includes the computer processor 208 and an associated memory module 210. The computer processor 208 manipulates the operation of the network interface 200, the user interface 202, and the file system 24, and associated behavior by executing related instructions, which are provided by a terminal operating system located in the memory module 210. A file system driver 300 and associated transponder access manager 304 (see FIG. 3) communicates with a RFID storage drive 302 of the file system 24, as further described below. Further, it is recognized that the device infrastructure 204 can include a computer readable storage medium 212 coupled to the processor 208 for providing instructions to the processor 208 and/or to load/ the file system 24 and associated driver 300 and manager module 304 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid-state memory card, or RAM provided in the memory module 210. It should be noted that the above listed example computer readable mediums 212 can be used either alone or in combination. The RFID file system 24 with related driver 300 and manager module 304 can be transmitted via the network 25 and loaded into the memory module 210 of a device infrastructure 204. Alternatively, the RFID file system 24 with related driver 300 and manager module 304 may be loaded via a serial connection, a USB connection, or a short-range wireless communication system such as IR, 802.11(x) Bluetooth™ (not shown). Once loaded onto the terminal 18 the RFID file system 24 with related driver 300 and manager module 304 can be executed by the processor 208 in the device infrastructure 204 for accessing and storing data associated with the transponders 22.

File System 24

In general, the file system 24 can include generic files 305 (see FIG. 3) that can be named and placed logically for storage and retrieval with respect to the user of the terminal 18. Generic files 305 contain data (e.g. alpha and/or numeric text) that is accessible by the user of the terminal 18 from the on-board memory 210. It is recognized that the generic files 305 are created/modified or otherwise accessible by the user independently from data contained in the spectrum 14. Further, it is recognized that the data contents of the generic files 305 are also preferably not dependent on updates from real time data contained in the spectrum 14. For example, DOS™, Windows™, OS/2 ™, Macintosh ™, and UNIX ™-based operating systems all have traditional file systems in which generic files 305 are placed somewhere in a hierarchical (tree) data structure (not shown). The generic file 305 is placed in a directory (e.g. a folder in Windows ™) or subdirectory at the desired place in the data structure. The generic files 305 are added/removed to/from the data structure of the memory 210 irrespective of the presence of the tags 22 in the surrounding spectrum 14, including modifications to the files' 305 data content.

It is recognized that the RFID file system 24 adapts the above mentioned storage architecture for tag files 306 (see FIG. 3), in addition to the generic files 305, for representing the number and/or data contents of scanned transponders 22 of the spectrum 14. The RFID files 306 have data content that is coupled to the data content of the tags 22 in the surrounding spectrum 14 of the terminal 18, in range of the antenna 16. It is noted that the files 306 contain data content as representative of any tags 22 in range of the terminal. Further, the presence, or lack thereof, of specific files 306 in a first memory location or drive 302 is preferably dependent on the tags 22 that are in range of the terminal 18. For example, when the terminal comes in range of any desired tag(s) 22, activation of the antenna 16 (through signals 20,21) will result in the creation of the corresponding RFID file(s) 306 in the RFID drive 302, in the example of the passive tag(s) 22. In the case of active tag(s) 22, the presence of file(s) 306 (number and data content) in the RFID drive 302 corresponds to the data content of transmitted signals 20 from any tags 22, as received by the terminal 18 via the antenna 16. It is therefore recognized that the number of and data content of files 306 in the drive 302 is coupled to the presence and data content of in-range tags 22, with respect to the terminal 18. It is also recognized that once created in the RFID drive 302, file(s) 306 and their contents can be persisted in memory 210 as directed by the configuration of the file system 24 (e.g. user and/or administrator memory settings). Further, it is also recognized that the files 306 and their data contents can be transferred to a second memory location or generic drive 303, as well as an external IMS, as desired. Accordingly, the files 306 can be manipulated by the user of the terminal, 18 once the files 306 and their data contents are deposited from the surrounding spectrum 14 into the drive 302.

The file system 24 specifies conventions for naming files, both generic files 305 and tag files 306. These conventions can include the maximum number of characters in a name, which characters can be used, and/or how long the file 305, 306 name suffix can be. The file system 24 also includes a format for specifying the path to the file 305,306 through the structure of directories. It is recognized that the file system 24 can be part of the operating system of the terminal 18, information management system 26 or an add-on program that supports the file system 24 as described above. Examples of such add-on operating systems include the Network File System (NFS) and the Andrew file system (AFS). It is further recognized that the file system 24 can include hardware used for nonvolatile storage, software applications that control the hardware, and the architecture of both the hardware and software as desired.

Referring again to FIG. 3, while typical storage drives 303 of the file system 24 describe physical cylinders or other magnetic contraptions, the RFID drive 302 represents something less tangible. The RFID drive 302 describes the RF spectrum 14, in range of the antenna 16, where the transponders 22 exist (e.g. one inch to ninety feet or more). Standard drives 303 represent physical units with well defined boundaries, while the RFID storage drive 302 capacity is, in theory, boundless, as there are no practical limits to the amount of transponders 22 that may exist in the RF spectrum 14 (although, it is noted that the RFID drive 302 is bound by the limits of RAM or other storage capacity 201 on the terminal 18 ). The RFID drive 302 cooperates in conjunction with in-range RFID tags 22. The RFID file system 24 represents the RFID tags 22 data contents in terms that are more readily understandable and useable by the operator of the terminal 18. An attempt was made at one time to represent each tag 22 as its own separate drive, but some tags 22 are read only with limited amounts of storage space (or none at all). Tag files 306 seem to fit the description of most every tag 22, as the files 306 can have any amount of data within them (from one to thousands of bytes), may be read/write-able or read-only, etc.

As mentioned above, the RFID File System Driver 300 exposes the interface (see FIGS. 5a, 5b) by which the operator can see the contents on the user interface 202 of the RFID tags 22, as files 306 in the drive 302. This means that the operating system shell (of the terminal 18) can, by default, provide a mechanism for viewing the tag files 306.

Representation of Tag 22 Data

Using a structured definition language (e.g. XML) to describe the data contents of the tags 22 provides for exposing the interface 202 that is highly flexible and adaptable to not only the wide variety of RFID tag 22 formats, but will provide for growth when new RFID tag 22 features are introduced. XML, for example, provides us a mechanism by which to describe the contents of the RFID tag 22 in detail, which can facilitate the ease of programming for end users. Virtually every commonly used language and computer operating system has constructs to manipulate XML. In cases where its not prudent, the nature of the data can be easy to manipulate using the most basic programming constructs.

XML (Extensible Markup Language), for example, is a flexible way to create common information formats and share both the format and the data on the World Wide Web, intranets, and elsewhere. For example, computer makers might agree on a standard or common way to describe the information about a computer product (processor speed, memory size, and so forth) and then describe the product information format with XML. Such a standard way of describing data can enable a user to send an intelligent agent (a program) to each computer maker's Web site, gather data, and then make a valid comparison. XML can be used by any individual and group of individuals/companies that want to share information in a consistent way. XML is similar to the language of today's Web pages, the Hypertext Markup Language (HTML). Both XML and HTML contain markup symbols to describe the contents of a page or file. HTML, however, describes the content of a Web page (mainly text and graphic images) only in terms of how it is to be displayed and interacted with. For example, the letter "p" placed within markup tags starts a new paragraph. On the contrary, XML describes the content in terms of what data is being described. For example, the word "phonenum" placed within markup tags could indicate that the data that followed was a phone number. This means that an XML file can be processed purely as data by a program or it can be stored with similar data on another computer or, like an HTML file, that it can be displayed. For example, depending on how the application in the receiving computer wanted to handle the phone number, it could be stored, displayed, or dialed. The file system 24 uses the structured definition language (e.g. XML) to manipulate the processing of the data contents of the RFID tag 22, as well as to standardize the communications 20,21 between the terminal 18 and the tags 22.

It is recognized that XSD (XML Schema Definition) can be used to specify how to formally describe the elements in an Extensible Markup Language (XML) document (i.e. tag file 306). This description can be used to verify that each item of content in a document adheres to the description of the element in which the content is to be placed. In general, a schema is an abstract representation of an object's characteristics and relationship to other objects. An XML schema represents the interrelationship between the attributes and elements of an XML object (for example, a document or a portion of a document). To create a schema for a document, you analyze its structure, defining each structural element as you encounter it. For example, within a schema for a document describing a Web site, you would define a Web site element, a Web page element, and other elements that describe possible content divisions within any page on that site. Just as in XML and HTML, elements are defined within a set of XML tags.

XML is the language, for example, that the RFID File System 24 uses for communication between the tags 22 and the terminal 18 and between the file system driver 300 and the RFID drive 302 (containing the RFID files 306). When the user of the terminal 18 opens the tag file 306 (i.e. interacts with the tag file 306 via the interface 202) in the RFID drive 302 and reads data from it, the data returned is XML in UTF-8 encoding, for example. Below is an example of the driver 300 when reading selected tag file 306 from the RFID drive 302 with the .TXT extension:

```
<rfid_tag>
    <type>EPC Class 1</type>
    <uid>
        <size>64 Bit</size>
        <data>
            <hex_dump>80ab00cd00123456</hex_dump>
            <epc_data>
                <epc_data_type>SGTIN-64</epc_data_type>
                <Header>128</Header>
                <Filter_Value>0</Filter_Value>
                <Company_Prefix>1368</Company_Prefix>
                <Item_Reference>26240</Item_Reference>
                <Serial_Number>1193046</Serial_Number>
            </epc_data>
        </data>
    </uid>
</rfid_tag>.
```

Each data part of the tag 22 is broken down and described by XML. Conversely, if the terminal 18 user wants to write data to the tag 22 (WriteFile), this write operation is also done in well formed XML. Ideally, for writing, the user need only identify in the XML buffer the tag type, size, and UID (not necessary to itemize the EPC parts).

Controlling the terminal 18 operation is done in the same fashion. In this instance, however, there is a different construct in place to access the terminal 18 vice tags (since there is no file that represents the terminal 18). In this instance, the user opens a handle to a file labeled "DeviceControl". This file 306 does not exist, but the RFID File System 24 will intercept this unique situation, and create a different kind of file handle for this instance. Any XML written with this handle is designed for controlling/querying the terminal 18 itself. Below is an example of retrieving the supported tag settings from the RFID tag 22:

```
<rfid_device><get>supported_tags</get></rfid_device>.
```

The first thing you notice is the ROOT XML tag: <rfid_device>. Any XML buffer could use this as the ROOT setting. The next new XML tag is <get>, which alludes to asking the RFID driver 300 for information, rather than telling it to do something. For certain settings, the markup <set>can be used to instruct the terminal 18 to perform an action or set a new setting. The string text between the <get></get>XML tags is "supported_tags". This has a dual role, as the XML that will be returned to the user with the supported XML tags data will use supported_tags as markup to identify the actual supported RFID tags 22:

```
<supported_tags>
    <type>EPC Class 0</type>
    <type>EPC Class 1</type>
</supported_tags>.
```

Further, users may use WriteFile to send either the get/set command combo, then turn around and use ReadFile to read the response (if a <get>command was specified). They may also, instead, use DeviceIoControl to write a command and get the response back in the same function call (NOTE: DeviceIoControl is probably not exposed as a construct that other languages such as C# and Java can utilize, thus they will have to rely on their specific routines that invoke just WriteFile/ReadFile). As one can see, using XML gives users a standardized way of interacting with RFID tags 22. It provides a detailed account of the RFID tag 22 preferably without utilizing an array of function calls or complicated data types. One need only have the rudimentary abilities to parse an XML UTF-8 buffer, for example. In addition, expandability is implied, such that if a new terminal 18 is introduced or new tags 22 that can be read that contain new information/features, the API set remains the same. The RFID File System 24 can simply more detailed XML data, thereby helping to promote backward compatibility and future expansion of the tag 22 and/or terminal 18 features and capabilities. It is recognized that the use of the structured definition language allows for the standard predefined definition of tag 22 types, tag 22 contents and features, as well as terminal 18 configurations and capabilities. Accordingly, the terminal 18 through its associated driver 300 will have advance knowledge of the data structures of supported tags 22, as well as the number and type of supported tags 22.

The RFID File System 24 can be applied to both Closed-Loop and open loop data management solutions. Further, it is recognized that the RFID File System 24 should be flexible enough to allow many changes/additions to its feature set. For example, in cases such as block oriented RFID tags 22 (i.e. ISO 18000), or on tags 22 with extra memory (e.g. Class 0+extra data area), the extra data can be added as an extra field to the XML data stream of the signals 20,21, when the user reads the data from the identified tag(s) 22 in the spectrum 14. File system 24 components While the RFID File System 24 enables tag 22 data manipulation to resemble operating on standard storage devices (e.g. generic files 305), it is recognized that there are some differences that set this file system 24 apart from standard file systems like FAT. For example, while there will be the appearance of the extra RFID drive 302 in the operating system object store memory 210, this is not indicative of extra memory. The RFID File System 24 preferably relies on user RAM for at least initial representation of the detected RFID tags 22, as files 306 represented in the RFID drive 302 and the file system 24 is thus constrained by the memory capabilities of the RAM. Further, tags 22 are discovered in the RFID spectrum 14 via certain terminal 18 commands (e.g. Inventory). So, the RFID files 306 preferably will not appear automatically upon opening of the RFID drive 302, , rather the RFID files 306 will appear in the RFID drive 302 as they are encountered in the RFID spectrum 14 as instructed by the user in operation of the terminal 18 (e.g. manual and/or programmed operation). Further, preferably only tags 22 will be allowed to be represented in the RFID drive 302 as the RFID files 306, where generic files 305 are preferably represented in the generic standard drive 303. Further, several of the APIs exposed for standard File System Drivers may not make sense for the RFID drive 302 of the RFID File System 24, such as but not limited to the ability to create a directory, and thus are not supported. Further, some APIs will have special abilities that go above and beyond most standard usage of said API, such as but not limited to the use of FindFirstFile as a vehicle for the inventory command, and still other APIs will have completely different abilities, as further described below. The details on example unsupported File APIs are listed in the Public Interface API section below.

File System Driver 300

As mentioned before, the RFID File System 24 is made up of several modules. The first is the RFID File System Driver (FSD) 300, see FIG. 3, such that the driver 300 exposes APIs that are manipulated by the operating system (e.g. FileSys.exe for Windows CE—Windows CE is a 32-bit multitasking, multithreading operating system), and these APIs allow application programs resident in memory 210 of the terminal 18 to operate on this "virtual" RFID drive 302 as if it were an actual storage device. The RFID File System Driver 300 exposes functions that allow it to be "mounted" in the object store of the operating system (e.g. the object store of Windows CE), and thus the RFID drive 302 shows up on the interface 202 with the drive 302 folder that contains a disk bitmap, indicating that it is a storage folder object, see FIG. 4.

Figure 5A:
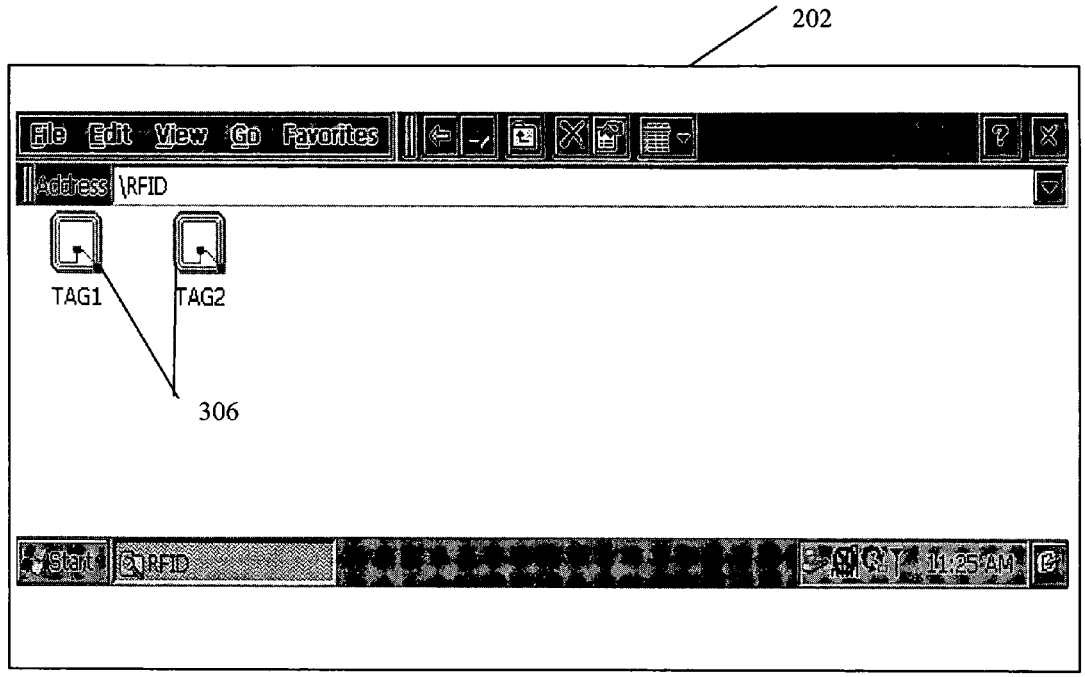
FIG. 5a is a further example interface of the terminal of FIG. 2.
Figure 5B:
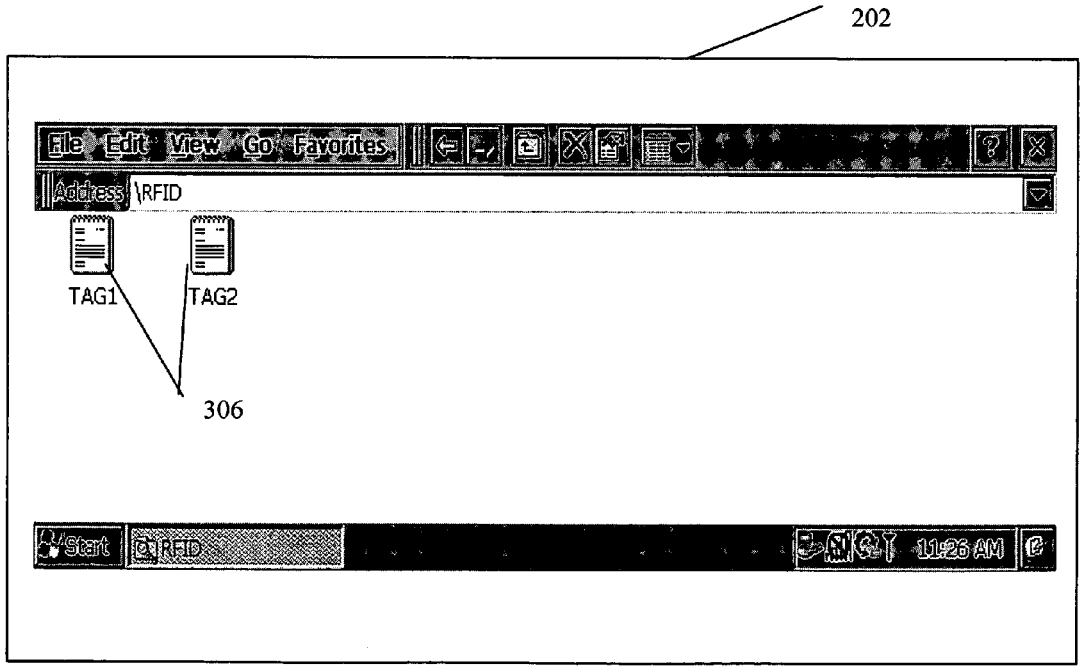
FIG. 5b is a further example interface of the terminal of FIG. 2.

Referring to FIGS. 5a and 5b, a default icon associations (i.e. user interface representations of the tag 22 information) are shown for tags 22 discovered (that of an actual RFID tag 22 in the spectrum 14), including such as but not limited to .TXT file formats. Unlike standard storage drives 303 which have been physically altered to maintain persistence of data, the RFID drive 302 may have no such mechanism. Thus, even if tags 22 are present near the terminal 18, and the user navigates into the RFID drive 302, preferably no such tag 22 will appear in the drive 302 until prompted by the user. This is because the RF energy that the RFID File System drive 302 represents is not active by default (and preferably shouldn't be, as this may require too much energy for a hand-held terminal 18 device to maintain over a long period of time). In order to 'discover' tags 22 in the RF spectrum 14, the appropriate access commands (e.g. read, write) for inventory are executed by the terminal 18. To maintain the structure of the File System 24, the API for file discovery (i.e. detecting the presence of in-range tags 22 and enabling the creation/modification of corresponding files 306 in the drive 302) is the vehicle by which our RFID inventory commands function (with certain caveats). The standard File API for file discovery is FindFirstFile( ) as processed by the Manager module 304 in conjunction with input by the user via the user interface 202, for example.

Manager Module 304

The manager module 304 provides interaction between the user (via the interface 202) and the RFID driver 300. The manager module 304 coordinates the access of tag 22 information from the spectrum 14 as well as access to the drives 302,303 and corresponding files 306,305 therein. As well, the module 304 can use a processing module 304 to coordinate the manipulation of tag 22 information contained in the RFID files 306. Further, user commands are handled by the manager module 304. These commands can provide standard wild card delimiters for file 306 and/or tag 22 search, so that all existing applications on the terminal 18 can use the RFID File System 24 as any other storage device. Thus, to invoke the Inventory command of the RFID File System 24, we have set aside certain unique (and, as such, highly unusable by normal applications) wild card strings that provide flexibility in our use of the RFID terminal 18. Below are descriptions of each, such as but not limited to:

"^."—If this wild card string is passed via the FindFirstFile command to the driver 300, the RFID File System 24 will invoke the RFID driver's 300 non-blocking inventory command. What this means is that FindFirstFile command will cause the terminal 18 to start an inventory command that continues to execute until it is asked to stop. In addition, the function call to the FindFirstFile command returns immediately (hence non-blocking). If the inventory command is executed successfully, the handle returned by FindFirstFile command is used in a call to FindClose in order to stop the RFID terminal 18 from executing the inventory command;

"{.}"—If this wild card string is passed via the FindFirstFile command, the RFID File System 24 will invoke the RFID driver's 300 BLOCKING inventory command. Like above, the FSD 300 invokes the inventory command, but unlike the aforementioned scenario, the FindFirstFile command will NOT return until a tag 22 is returned, as located in the spectrum 14. It is recognized that the FindFirstFile command can be configured for finding certain tag 22 types, data portions of the tag 22 contents (e.g. tag ID, name, type, or other header information, or selected data contents), as well as limited/specified quantity of tags 22; and "[.]"—This wild card does not invoke the inventory command, but rather causes the call to FindFirstFile to block until the RFID tag 22 is acquired by the terminal 18 (in this fashion, either the trigger of the terminal 18—antenna 16 activation device—causes the search for RFID tags 22 in the spectrum 14, or another user thread).

The, manager module 304 can operate in conjunction with the trigger mechanism (e.g. part of the user interface 202) for invoking the RFID terminal 18 to execute the inventory command, and thus collect RFID tag 22 data from the spectrum 14. In the RFID File System 24, the trigger is monitored by a thread, which will then invoke FindFirstFile( )commands with the "^." non-blocking inventory command, for example. The release of the trigger by the user causes the thread to close that active handle, and therefore stopping the inventory command at the driver level. Invoking the inventory command can cause the following example bitmap to be displayed in the user's view via the user interface 202.

While this bitmap is displayed, the RFID terminal 18 is actively searching for tags 22 in the spectrum 14. Once the trigger is released (the FindFirstFile handle is closed), then the indicator disappears from the user interface 202 and the user is thereby informed that the terminal 18 is no longer searching for available tags 22. Further, other standard search wild cards (i.e. "*.*") work as they would in any other file system. A call to FindFirstFile directed at the RFID drive 302 with the *.* wild card will attempt to acquire any RFID tag file 306 that may exist there. Also, specific searches for tags 22 in the spectrum 14 (i.e. TAG1.TXT) work as expected.

It is recognized that the manager module 304 can be used to manipulate tag files 306, once created, the same way that standard files in a typical file system (in most cases). The tag files 306 can be copied to another file system, renamed and even deleted. Another feature of the RFID File System 24 is the ability to "Flush" or consume all of the tag files 306 resident in the drive 302 in one command, e.g. DeleteFile (L"\\RFID\\>.<"). In its basic form, flushing the file system 24 means to remove all of the tag files 306 from the drive 302. However, there are features (see Portal section below) that key off of a flush event, such as to collect all of the data in the files 306 present in the RFID drive 306, and copy that data in XML format to another network(e.g. IMS). These features can be listed in an RFID File System Control Panel Applet 400 (discussed below). Supported File APIs are discussed in the section, Public Interface APIs.

Control Module 402

The control module 402 provides for customization/configuration of the file system 24 operation with respect to data transmission/retrieval by the signals 21,20, file 306 manipulation commands, as well as presentation of the data obtained from tags 22 on the user interface 202. The module 402 can be provided to the user as a selection of a typical operating system control panel 400.

Figure 3:
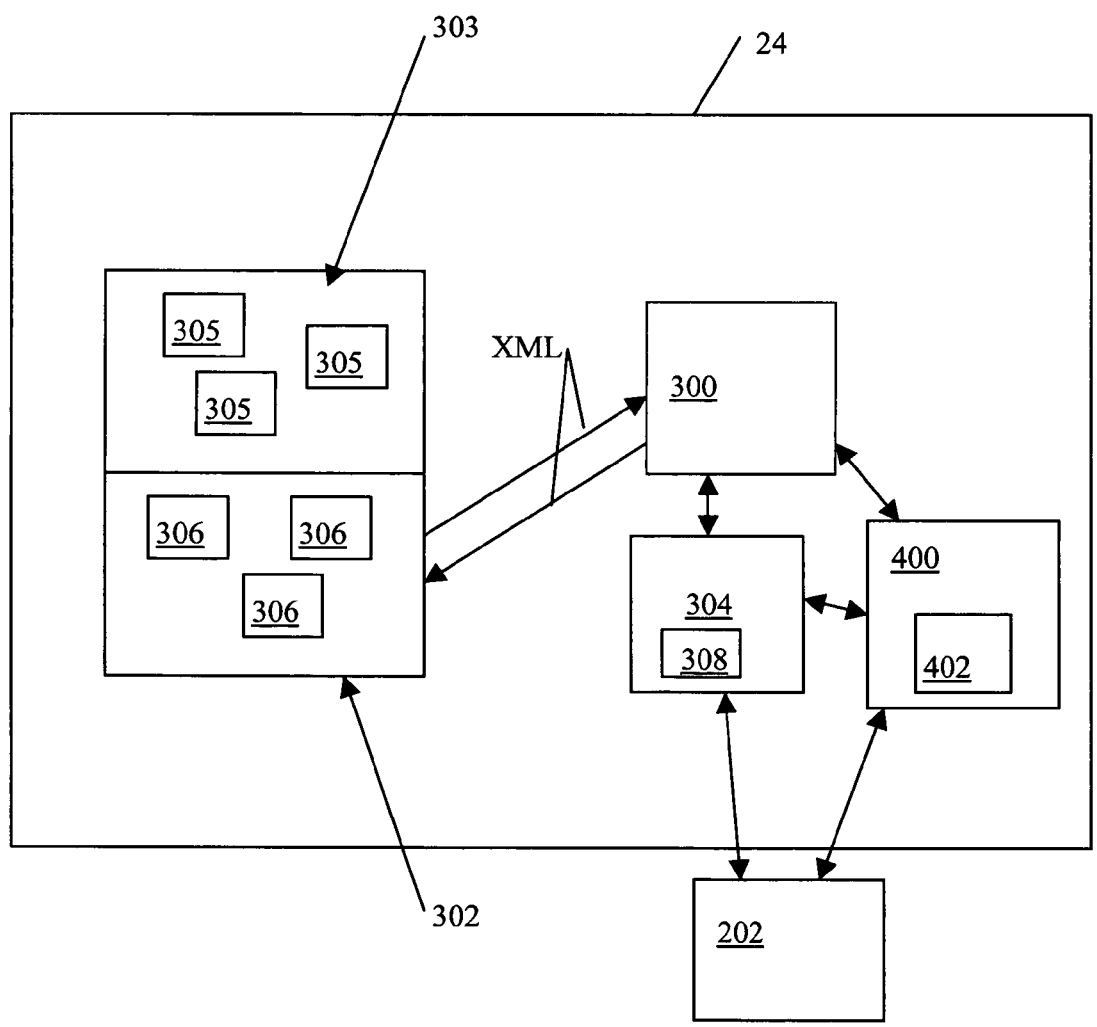
FIG. 3 is shows a RFID file system.
Figure 4:
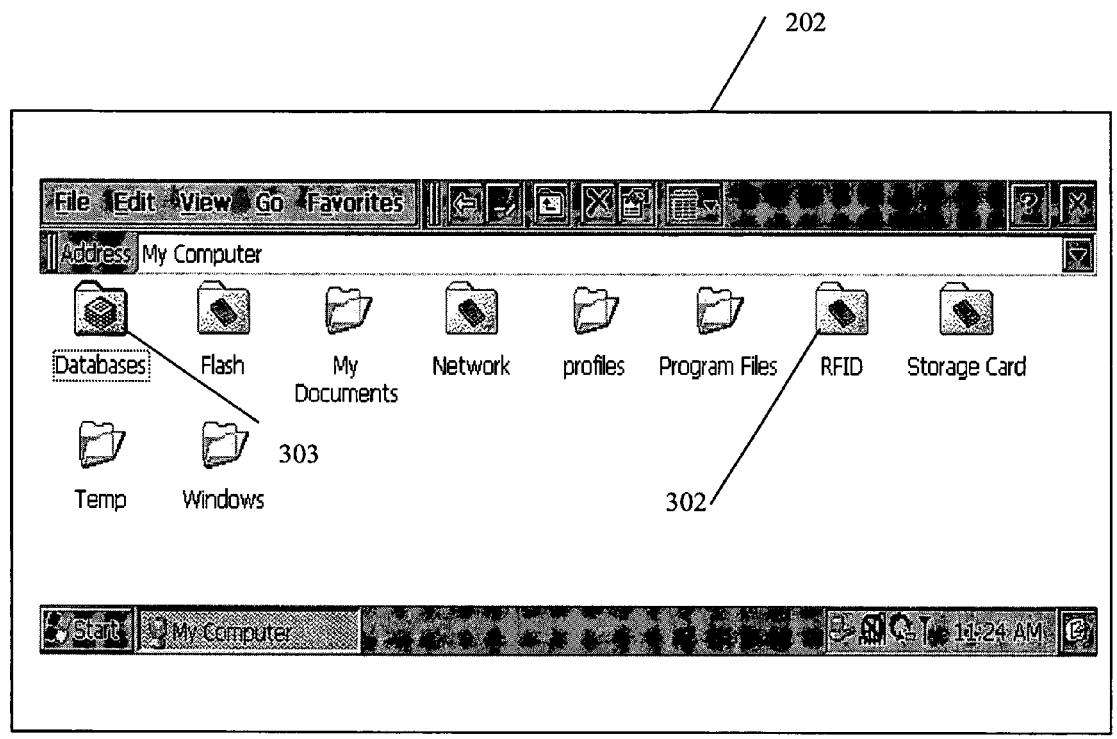
FIG. 4 is an example interface of the terminal of FIG. 2.
Figure 6:
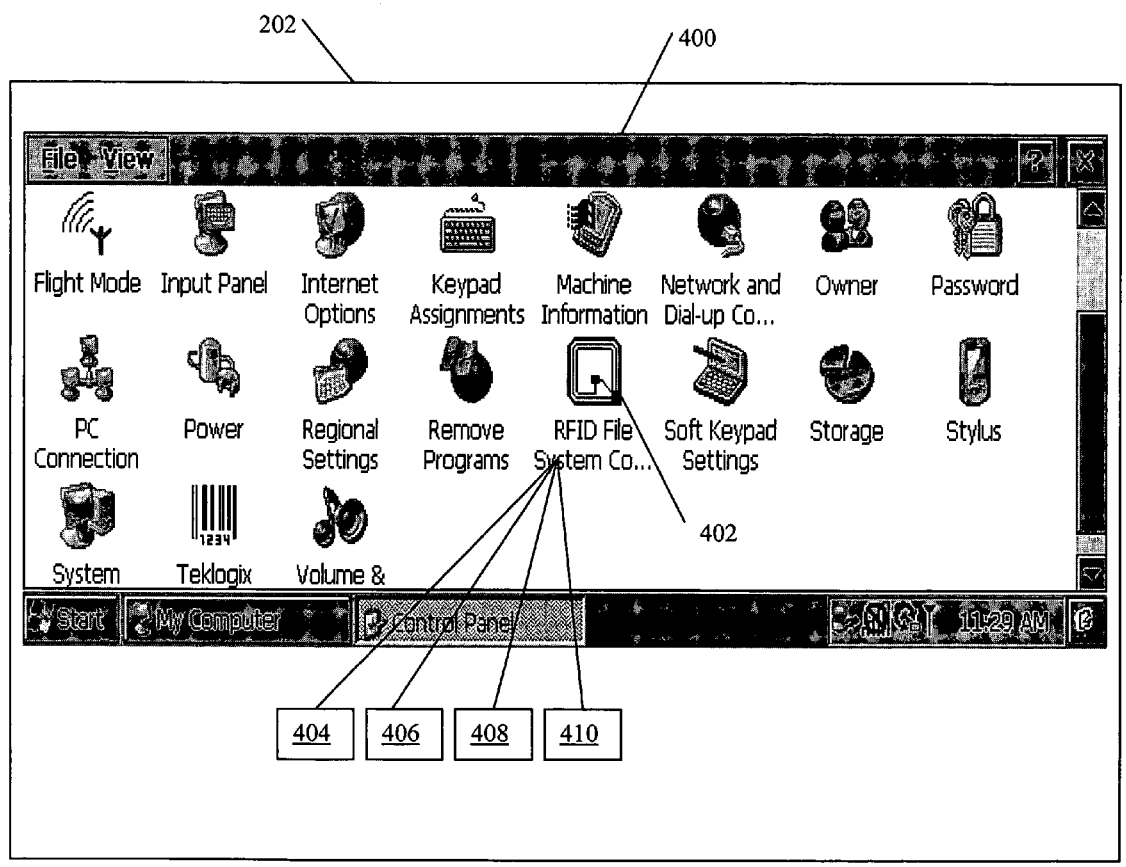
FIG. 6 shows an example control panel of the terminal of FIG. 1.

RFID Control Module 402:

Referring to FIGS. 3 and 6, like Scanner Control Services (SCS), the RFID File System 24 will utilize the control panel 400 (e.g. configuration module) to help users configure the RFID File System 24 to fit their needs. Ideally, the RFID File System Control Panel Module (CPL) 402 implements custom solutions (i.e. configuration) for particular customers who require a little bit more than what the base RFID driver 300 provides. If the driver 300 is not loaded onto the terminal 18 (which may be the case for tether port RFID units), then all of the settings on this applet tab 402 will be disabled implementation. Below is a description of the current feature set offered by the CPL module 402, such as but not limited to:

Tab 404: Inventory Discovery

This tab 404 houses all of the features/traits revolving around the inventory command common to all RFID terminals 18. This tab 404 can be RFID terminal 18 specific (some terminals 18 may not have identical tag 22 discovery capabilities, so this tab 404 may be disabled). Since this tab 404 relies on information from the driver 300, when the driver 300 is loaded on the terminal 18 the settings will be enabled. The first control (a combo box) allows a user to select the type of tag 22 to inventory. The types format in this field are specific to the RFID terminal 18 and may be specific with each type of RFID driver 300 (it is recognized that each terminal 18 may have more than one driver 300 present in the file system 24). It is recognized that the number of tags 22 identified can be specified also through this setting (i.e. the maximum/minimum number of tags 22 imported into the drive 302).

The second setting is labeled "Inventory ANY Supported Tag", which, for RFID terminals 18 with multi-protocol support, will return any supported tag 22 in the RF spectrum 14, regardless of the choice in the "Type" combo. The third setting is "Nearest Tag Inventory", which allows users to attempt to retrieve the closest tag 22 to the terminal 18 (NOTE: highly susceptible to the transmission capabilities of the RFID tag 22 itself). The fourth setting is a check-box labeled "Display after inventory". This setting toggles controls of the display of a dialog box in the user interface 202 that is shown following a trigger release and acquisition of tags 22, showing a summary of the download of tag 22 data to the terminal 18. Currently, without this feature, if the user were to scan tags 22, but were not within the RFID drive 302, they would not see the occurrence of the tags 22. With this feature selected, the user will be shown a dialog on the user interface 202 that displays minimal information on each tag 22 that has been scanned by the RFID File System 24 (e.g. tag 22 header information such as the tag name and optionally rudimentary information on the data contents). The last setting is the "Prevent File Flush" setting, which prevents any file flush action in the event the user depresses then releases the trigger immediately, for example.

Figure 7:
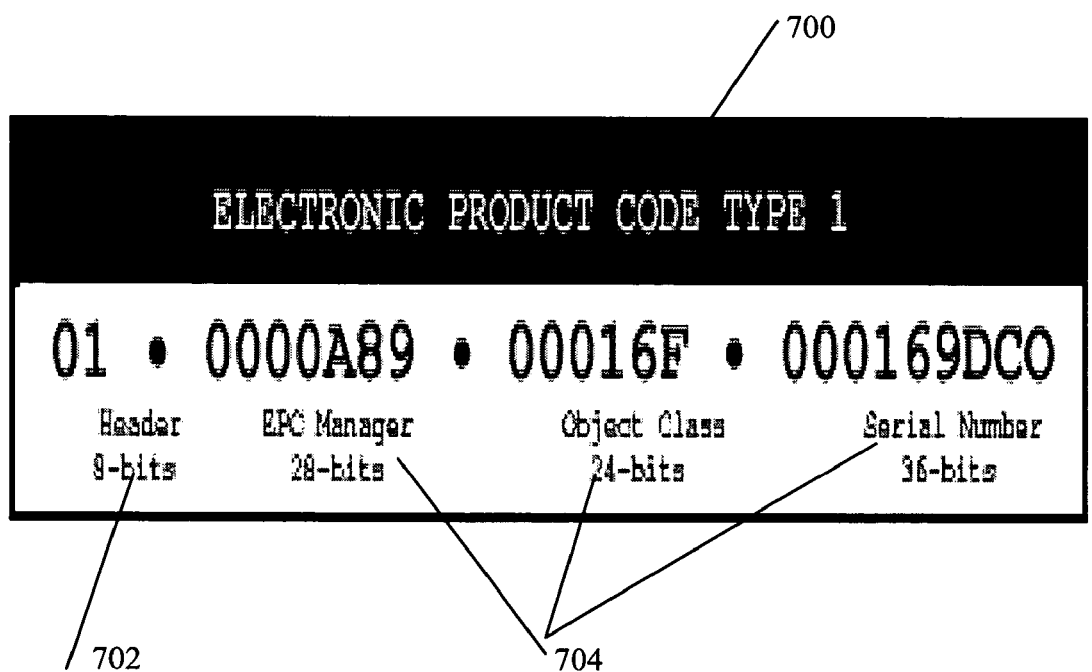
FIG. 7 is an example information of the transponders of FIG. 1.

An example tag 22 format 700 is shown in FIG. 7. The EPC is a number made up of a header 702 and 3 sets of data 704 as shown in the figure below. The header 702 identifies the EPC version number—which will allow for different lengths or types of EPC later on. The second part of the number identifies the EPC manager—typically this would be the manufacturer of the item the EPC is attached to. The third part is called object class and refers to the exact type of product—most often the stock-keeping unit (SKU). The fourth series of numbers is the serial number that is unique to the item. (The second and third sets of data are similar in function to the numbers in UPC barcodes.) Above is an example of a 96-bit EPC. It will allow sufficient capacity for 268 million companies. Each manufacturer will have the ability to create up to 16 million object classes with 68 billion serial numbers in each class.

Tab 406: File

This tab 406 controls how the tag files 306 appear in the file system 24. The first setting allows the user to choose how the tag files 306 are named. Currently, for example, they have a choice between the Serial Number of the tag 22 (that is, if the tag 22 is EPC compliant and has a Serial Number . . . if the tag 22 doesn't, then the first setting defaults to a second option), the full UID (in hex), or a generic label "TAG" followed by a digit that describes the tags 22 numerical placement in the RFID drive 302 with respect to other tags 22 (i.e. TAG1 is the first tag in the RFID drive 302, TAG2 is the second, and so on).

The second setting controls the tag files 306 extension. The first choice is DEFAULT, which indicates that each RFID tag 22 type will receive a unique extension that identifies that type (e.g. TEO is used for EPC type one tags, .TEZ for EPC type zero, and so on). For example, the first tab 404 (Inventory) displays which color tag icon representing the file 306 is associated with each RFID tag type. The other choices (e.g. .TXT and .XML) are applied to every tag file 306, regardless of tag 22 type. At the bottom of this setting can be a list-box that contains icons that resemble RFID tags 22 in different colors, followed by RFID tag types,as a guide to the user of the terminal 18. This guide basically explains to the user how the RFID tags 22 will appear in the RFID File System 24.

Tab 408: Portal

This tab 408 is used to be compatible with the RFID file system 28. The first setting of this tab 408 controls if the tag 22 data that is accumulated in the RFID drive 302 is collected into one XML file and copied to another drive (typically a remote drive or the drive 303. There can be an edit box that allows user to set the location where the resultant XML file is to be copied. In accordance with CottyWare, the XML that is copied can be scaled down from the XML that is reported from the RFID File System 24, to accommodate desired predefined levels of information retrieval from the tags 22. As predefined levels of information retrieval from the tags 22. As mentioned by the name of the setting, the action can only take place on a "Flush" event, where the data in the drive 302 is consumed then removed. The other setting of the tab 408, for example, can be used to help identify pallet tags 22 (i.e. a master tag 22 that is coupled to a plurality of dependent tags 22—e.g. one master tag 22 for all tags 22 contained on a pallet of tagged containers). Based on certain EPC fields, if the tag 22 that is EPC compliant and has a filter value that matches the one in this tab 408, the file 306 will receive an extension different than the one that it normally has. For example, this extension will receive from the shell an icon that looks like a pallet, so that it can be easily differentiated from other tag files 306 of the same tag 22 type.

Tab 410—Driver Selection

This tab 410 can be used by the user to select from a list of available drivers 300 so as to synchronize the configuration of the file system and display features/capabilities of the user interface 202 with the driver 300 installed on the terminal 18.

Public Interface (APIs)

Access to the file system 24 by the driver 300 is supported by the operating system of the terminal 18 for example Windows CE. Accordingly, standard APIs (e.g. Win32 File API) can be used to access the tag 22 (and temporary) files 306 of the drive 302. The following APIs can be supported for use by the driver 300, such as but not limited to:

Create File;
Read File;
Write File;
Set File Pointer;
Delete File;
Copy File;
Delete And Rename File;
Find First File;
Find Next File;
Find Close;
Get File Attributes;
Set File Time;
Get File Time;
Get File Size; and
Device IO Control.

Referring to FIG. 8, an example code 800 of the driver 300 including use of a number of APIs 802. For example, as show is to find a tag 22, open the tag file 306, and determine how much data the terminal 18 can accommodate/is configured for, and then read the maximum amount of data as specified.

Further, other APIs could be added to the above supported API set asc needed, such as but not limited to:

Create Directory;
Remove Directory: and
Move File—this API is used to move a file from its RFID directory 302 (and delete it) to another directory.

Further, the following APIs may not be supported by the driver 300 for accessing the tags 22 and the files 306, such as but not limited to:

Get Disk Free Space Ex—this can't be used, as there is effectively an infinite amount of RF space available in the spectrum 14;
Write File With Seek—user's will write to the tag file 22 in one shot (in XML). Writing in increments may not be supported, thus this API (designed to write in increments) may not be exposed for usage; and
Read File With Seek—user's may need to read the entire contents of the tag file 306 at once (in XML). Reading in increments may not be supported, thus this API (designed to read in increments) may not be exposed for usage.

Figure 9:
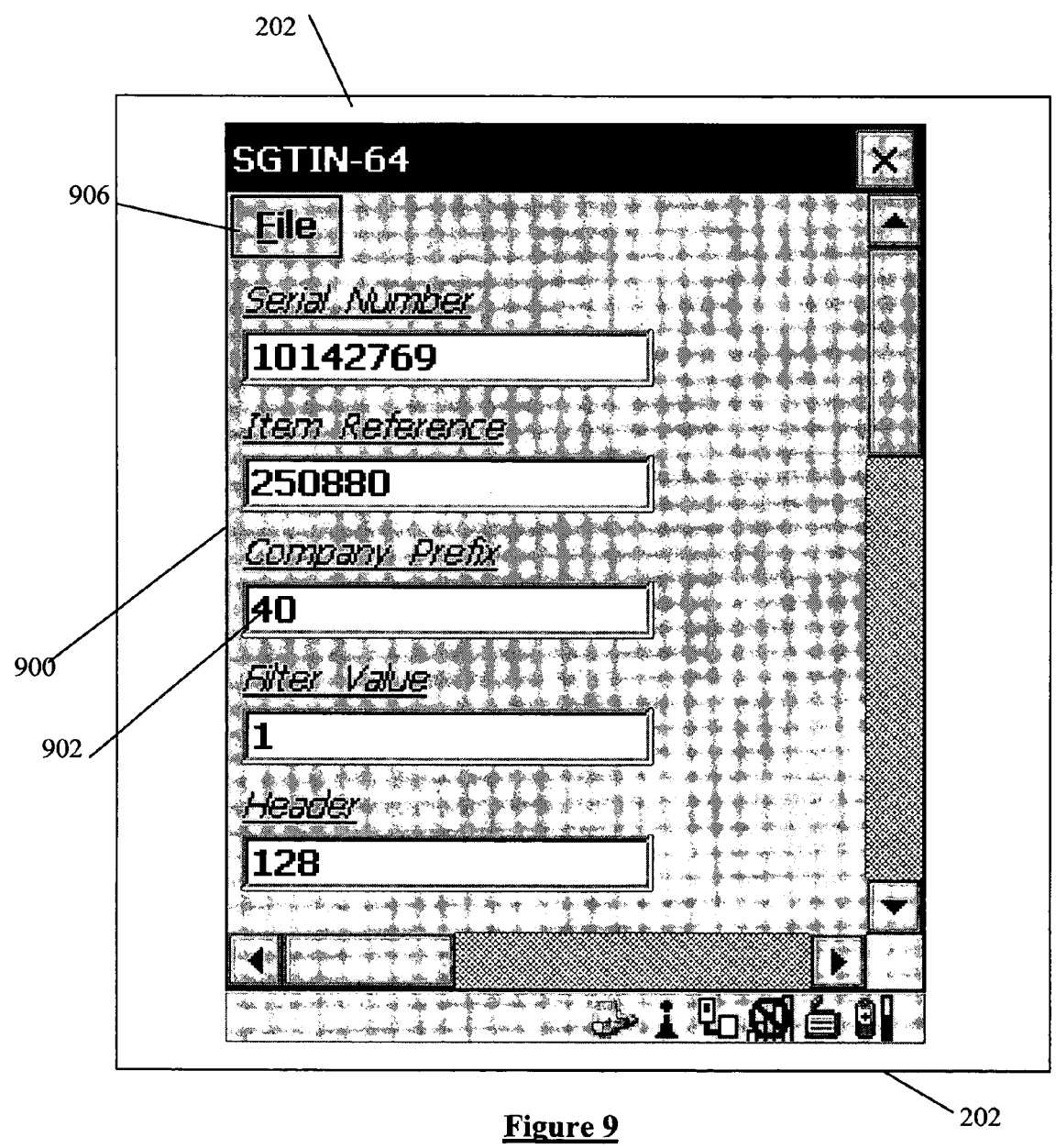
FIG. 9 shows an example browser application for displaying the information contents of the transponders on a user interface of the terminal of FIG. 2.

The RFID File System Browser:

Referring to FIG. 9, a browser 900 is a companion application used to display the XML contents of the tag file 306 in a more easily useable format. The browser 900 can be configured to interpret the XML markup and its data of the file 306 into separate fields, and displays all numeric values in edit boxes 902. For example, if the tag 22 is not EPC compliant, then there is only one edit box 902 that holds the entire UID of the tag 22 (in hex format). If the tag 22 is EPC compliant, then all of the various EPC fields are delineated in their own respective edit boxes 902.

The browser 900 can be automatically launched whenever the tag file 306 has its default file extension set (i.e. the tag icon). The user can simply double-click the tag file 306 via the user interface 202, and the relevant application program of the terminal 18 will run and display the contents of the selected tag file 306 on the user interface 202, as per the settings configured by the module 402 (see FIG. 4). Further, the browser 900 can have a menu item 906, called 'File'. Under this menu item 906 can be a selection called 'Save'. This setting allows the user to write back any changes made to the edit boxes back to the tag 22 via signals 21. This feature adds to the "Out-of-the-box" functionality by allowing users to not only read the tags 22 in the surrounding spectrum 14, but write to the tags 22 as well without having to write their own software for tag 22 access and manipulation.

Terminal 18 operation

Figure 10:
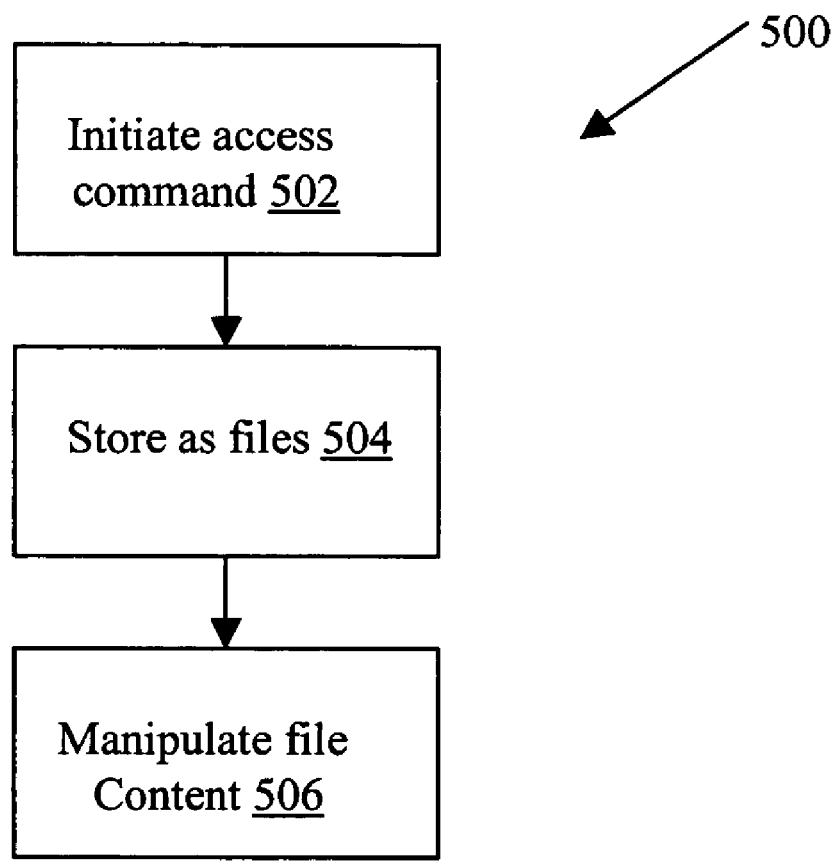
FIG. 10 is an example operation of the RFID file system of FIG. 3.
Figure 11:
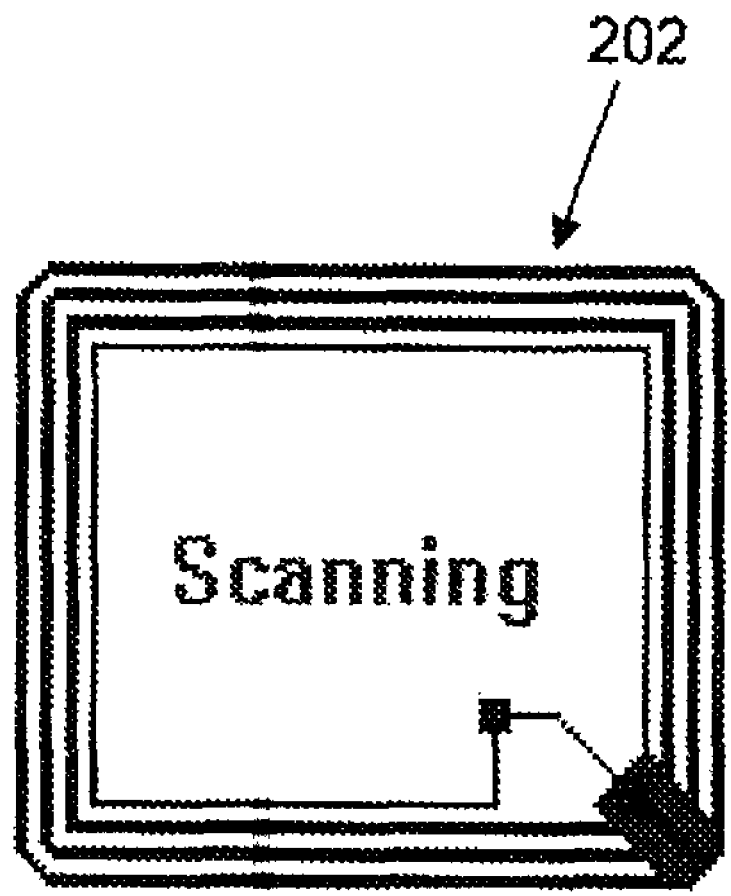
FIG. 11 is an example user interface of the RFID file system of FIG. 3.

Referring to FIG. 10, a method 500 is shown for representing on the user interface 202 a plurality of the transponders 22 in the file system 24 of the computing device or terminal 18. As noted above, the terminal 18 is configured for communicating with the transponders 22 when they are present in the electromagnetic spectrum 14 in communication range of the terminal 18, such that the communication between the transponders 22 and the terminal 18 use radio frequency signals 20,21 to obtain data of the transponders 22. The method 500 starts at step 502 for transferring the transponder information between the transponder 22 and a first memory location (i.e. the RFID drive 302) according to an access command, the access command configured for directing the terminal 18 to obtain the transponder information for the transponders 22 when in communication range of the terminal 18. At step 504 the obtained transponder information is stored in the RFID drive 302 as a plurality of corresponding transponder files 306 in the file system 24. At step 506, the user then can manipulate the transponder information present in the transponder files 306 as displayed on the user interface 202. It is noted that the transponder information contents of the transponder files 306 represents at least a portion of the transponder 22 information available in the electromagnetic spectrum 14 in communication range of the terminal 18, such as but not limited to a transponder ID, a transponder type, and data associated with the object attached to the transponder 22.

It is recognized that as described above, presenting RFID tag information as the files 306 in the file system 24 gives users of the terminal 18 an established method for interacting with the tags 22. For example, generally most users of the terminal 18 understand the basics of how to manipulate generic files 305 on a typical storage device/drive 303, so education of the user for manipulation of RFID files 306 can be straightforward. Further, the file system 24 approach can provide an automatic presentation layer on the user interface 202 that will allow users to realize the benefit and utility of RFID tags 22. As mentioned above, users understand file systems, and can read/write data to tags 22 without writing a custom service. In addition, user's can utilize the RAPI (Remote API) features of the operating system (e.g. Windows CE) and, using ActiveSync for example, simply pluck RFID tags 22 from the file system 24 from their desktop, theoretically freeing developers from writing any software for the terminal 18. Further, for users that wish to develop custom applications that read/write to tags 22 directly, the file system 24 described above can offer a high degree of flexibility, because it exposes tags 22 as files 306 in the file system 24. Most (if not all) programming languages provide native support for file 305,306 access, which lends a degree of choice when it comes to which language to use.

I claim:

1. A system for representing on a user interface a plurality of transponders in a file system of a computing device, the user interface provided by the device, the device configured for communicating with the transponders when present in an electromagnetic spectrum in communication range of the device, the communication between the transponders and the device using radio frequency signals to obtain information of the transponders, the system comprising:
   a first memory location of the device configured for storing the transponder information as a plurality of corresponding transponder fifes generated in the file system, the presence of the plurality of corresponding transponder files in the file system dependent on the transponders being in communication range of the device, such that the data content of the transponders is coupled to the data content of the plurality of corresponding transponder files in the file system;
   a driver for coordinating the transfer of the transponder information between the transponder and the first memory location according to an access command, the access command configured for directing the computing device to obtain the transponder information from the transponders when in communication range of the device; and
   a file processor for manipulating the transponder information present in the transponder files;
   wherein the transponder information contents of the transponder files represents at least a portion of the transponder information available in the electromagnetic spectrum in communication range of the device.

2. The system of claim 1, wherein the driver is configured to indicate when an accessed transponder is no longer present in the electromagnetic spectrum in communication range of the device.

3. The system of claim 2, wherein the driver is configured to remove the transponder files from the first memory location of any accessed transponders indicated as no longer present in the electromagnetic spectrum in communication range of the device.

4. The system of claim 1 further comprising a second memory location for persisting the transponder files in a file system data structure, the persisted transponder files accessible by the driver Irrespective of whether the corresponding transponders remain present in the electromagnetic spectrum in communication range of the device.

5. The system of claim 4, wherein the second memory location is a storage device.

6. The system of claim 5, wherein the transponder information is selected from the group comprising: a transponder ID; a transponder type: and data describing an object associated with the transponder.

7. The system of claim 6, wherein the transponder information is stored in the transponder according to a structured definition language format.

8. The system of claim 6, wherein the format of the transponder files are in accordance with the structured definition language format.

9. The system of claim 7, wherein the structured definition language format is XML.

10. The system of claim 1 further comprising a control module for providing configuration settings for the access command.

11. The system of claim 10, wherein the control module is further configured for providing configuration setting for presentation of the transponder files on the user Interface of the device.

12. The system of claim 1 further comprising the control module as a selection of a control panel displayable on the user interface.

13. A method for representing on a user interface a plurality of transponders in a file system of a computing device, the user interface provided by the device, the device configured for communicating with the transponders when present in an electromagnetic spectrum in communication range of the device, the communication between the transponders and the device using radio frequency signals to obtain information of the transponders, the method comprising the steps of:
   transferring the transponder information between the transponder and a first memory location of the device according to an access command, the access command configured for directing the computing device to obtain the transponder information from the transponders when in communication range of the device;
   storing the transponder information in the first memory location as a plurality of corresponding transponder files generated in the file system, the presence of the plurality of corresponding transponder files in the file system dependent on the transponders being in communication range of the device, such that the data content of the transponders is coupled to the data content of the plurality of corresponding transponder files in the file system; and
   manipulating the transponder information present in the transponder files;
   wherein the transponder information contents of the transponder files represents at least a portion of the transponder information available in the electromagnetic spectrum in communication range of the device.

14. The method of claim 13 further comprising the step of accessing the plurality of transponders using the access command configured to communicate with the transponders according to a structured definition language format.

15. The method of claim 14, wherein the access command is selected from the group comprising: a read access and a write access.

16. The method of claim 13 further comprising the step of indicating when an accessed transponder is no longer present in the electromagnetic spectrum in communication range of the device.

17. The method of claim 14 further comprising the step of removing the transponder files from the first memory location of any accessed transponders indicated as no longer present in the electromagnetic spectrum in communication range of the device.

18. The method of claim 13 further comprising the step of transferring the contents of the transponder files to a second memory location for persisting the transponder files in a file system data structure, the persisted transponder files accessible by the driver irrespective of whether the corresponding transponders remain present in the electromagnetic spectrum in communication range of the device.

19. The method of claim 1, wherein the second memory location is a storage device.

20. The method of claim 13, wherein the transponder information is selected from the group comprising: a transponder ID; a transponder type; and data describing an object associated with the transponder.

21. A computing device for representing on the device user interface a plurality of transponders in a file system, the device configured for communicating with the transponders when present in an electromagnetic spectrum in communication range of the device, the communication between the transponders and the device using radio frequency signals to obtain information of the transponders, the system comprising:
- a first memory location of the device configured for storing the transponder information as a plurality of corresponding transponder files generated in the file system, the presence of the plurality of corresponding transponder files in the file system dependent on the transponders being in communication range of the device, such that the data content of the transponders is coupled to the data content of the plurality of corresponding transponder files in the file system;
- a driver of the device for coordinating the transfer of the transponder information between the transponder and the first memory location according to an access command, the access command configured for directing the computing device to obtain the transponder information from the transponders when in communication range of the device; and
- a file processor of the device for manipulating the transponder information present in the transponder files;

wherein the transponder information contents of the transponder files represents at least a portion of the transponder information available in the electromagnetic spectrum in communication range of the device.

22. The system of claim 1 further including a plurality of generic files stored in the file system, such that the generic files are accessible independently from transponders contained in the electromagnetic spectrum in communication range of the device.

23. The system of claim 1, wherein the file system specifies conventions for naming the generic files and the transponder files.

24. The system of claim 1, wherein the file system includes a format for specifying a path to the transponder files through a structure of directories.

25. The system of claim 1, wherein the transponder files are stored in a RFID drive folder of the file system.

26. The system of claim 25, wherein the file system also includes a plurality of generic files stored in the file system, such that the generic files are accessible independently from transponders contained in the electromagnetic spectrum in communication range of the device, the generic files are also defined by specifying a path to the generic files through the structure of directories.

27. the system of claim 26, wherein the transponder files and the generic files are named in the file system including respective file extensions that indicate the respective file type of the transponder files and the generic files.

* * * * *

UNITED STATES PATENT AND TRADEMARK OFFICE
CERTIFICATE OF CORRECTION

PATENT NO.       : 7,962,096 B2
APPLICATION NO.  : 11/245217
DATED            : June 14, 2011
INVENTOR(S)      : Cox It is certified that error appears in the above-identified patent and that said Letters Patent is hereby corrected as shown below:

In the Drawings:

In Fig. 2, Sheet 2 of 11, for Tag "202", in Line 2, delete "Interface" and insert -- interface --, therefor.

In the Specifications:

In Column 2, Line 66, delete "is shows" and insert -- shows --, therefor.

In Column 3, Line 13, delete "2; and" and insert -- 2; --, therefor.

In Column 3, Line 15, delete "3." and insert -- 3; and --, therefor.

In Column 6, Line 63, delete "18" and insert -- 18, --, therefor.

In Column 7, Line 53, delete "terminal, 18" and insert -- terminal 18, --, therefor.

In Column 7, Line 67, delete "file system" and insert -- File System --, therefor.

In Column 11, Line 13, delete "302, , rather" and insert -- 302, rather --, therefor.

In Column 11, Line 50, delete "303" and insert -- 303, --, therefor.

In Column 12, Line 50, delete "The," and insert -- The --, therefor.

In Column 13, Line 53, delete "18" and insert -- 18, --, therefor.

In Column 14, Line 61, delete "303." and insert -- 303). --, therefor.

In Column 15, Line 22, delete "18" and insert -- 18, --, therefor.

Signed and Sealed this
Thirtieth Day of April, 2013

Teresa Stanek Rea
*Acting Director of the United States Patent and Trademark Office*

CERTIFICATE OF CORRECTION (continued)
U.S. Pat. No. 7,962,096 B2

In Column 15, Line 48, delete "asc" and insert -- as --, therefor.

In Column 15, Line 50, delete "Directory:" and insert -- Directory; --, therefor.

In Column 16, Line 66, delete "user's" and insert -- users --, therefor.

In the Claims:

In Column 17, Line 56, in Claim 4, delete "Irrespective" and insert -- irrespective --, therefor.

In Column 17, Line 63, in Claim 6, delete "type:" and insert -- type; --, therefor.

In Column 18, Line 11, in Claim 11, delete "Interface" and insert -- interface --, therefor.

In Column 20, Line 27, in Claim 27, delete "the system" and insert -- The system --, therefor.